Patented Dec. 8, 1942

UNITED STATES PATENT OFFICE 2,304,440

2,304,440
METHOD OF TREATING THE ROCK, APLITE, AND OF MAKING CERAMIC WARE

Ralph F. Brenner and Roger D. Dubble, Lancaster, Ohio, assignors to Dominion Minerals, Incorporated, Washington, D. C., a corporation of Virginia No Drawing. Application December 5, 1940, Serial No. 368,694

3 Claims. (Cl. 23—110)

Our invention relates to a method of treating the rock, aplite, and of making ceramic ware. It is particularly applicable to the treatment of aplite to make it suitable for use in the making of glassware, although it is not necessarily limited thereto.

In the prior art, with particular relation to glassware, one of the important ingredients used has been feldspar. One of the principal reasons for using this material is the alumina content. However, the attainment of a relatively high alumina content by the use of feldspar is attended with certain disadvantages, particularly related to the cost of the alumina which is one of the principal ingredients introduced by the addition of feldspar.

One of the objects of this invention is to provide a material which will serve, in whole or in part, as a substitute for feldspar in ceramic materials and which will permit the introduction of a high alumina content into ceramic products at a relatively low cost.

Another object of this invention is to provide a material which may be introduced into ceramic batches and particularly into glassware batches, which material will be cheaper than feldspar and which will, at the same time, increase the alumina content in the ceramic batch.

Another object of this invention is to provide a method of treating the rock, aplite, which will reduce the iron content in relation to the alumina content therein so that it will be as good as some feldspars and better than others.

Another object of this invention is to provide a method of treating the rock, aplite, in such a way as to render it suitable for use in the making of crystal or flint glass.

We have discovered that the rock, aplite, which has a higher alumina content than feldspar, may be utilized in a ceramic batch to obtain as good or better results than feldspar, from the standpoint of alumina content, provided such rock is first properly treated. We have further discovered that this rock, aplite, if properly treated may be caused to have an iron content in relation to the alumina content that will be a least as low as some feldspars and lower than others and will be at least as suitable or more suitable for the making of crystal or flint glass.

Aplite is a rock product, commercially mined chiefly in Virginia. It is composed of several minerals in the following approximate amounts:

| | Per cent |
|---|---|
| Zoisite | 23 |
| Albite | 55 |
| Titanite, apatite and clino-zoisite | 2 |
| Quartz | 2 |
| Sericite | 13 |
| Microcline | 5 |

Normally, there is a greater ratio of iron oxide to alumina in aplite than in good grades of feldspars which are now in use.

In the prior art, aplite has been used for making ceramic ware, such as light green or colored glasses. However, because of the relatively high ratio of iron to alumina content, it has not generally been used in the manufacture of crystal or flint glass. Until the present time, sodium or potassium feldspars have normally been used in the making of crystal or flint glasses in order to produce therein the desired alumina content. Many attempts have been made to lower the iron content in relation to the alumina content of aplite, so that it might be used in better glasses such as crystal or flint glass. However, until our invention, these attempts have not been successful.

One process used today in the treatment of aplite for use in glass batches is the removal of the iron magnetically. However, prior to our invention, it has only been possible to lower the iron oxide content to about 0.25%. To be satisfactory for the use in the making of higher classes of ceramic material and particularly in the making of crystal or flint glass, the iron oxide content should be no more than 0.10 to 0.15% and it is highly desirable that it be less than 0.1%.

Feldspar which is now being used in higher class ceramic materials such as crystal or flint glass generally has an iron oxide content ranging from 0.075 to 0.10%. However, feldspar is relatively high priced in comparison with aplite and the alumina content of feldspar is relatively low in comparison with aplite.

Our invention relates more particularly to the treatment of the rock, aplite, by first calcining at temperatures ranging up to 2500° F. Preferably our invention contemplates the treatment of such aplite at temperatures ranging from 1000° to 2100° F.

After this calcining operation, the aplite is preferably treated first with hydrochloric acid and then with sulfuric acid, being then washed free of soluble iron salts and acids by water. However, our experiments have indicated that sulfuric acid alone will obtain good results. Likewise, our experiments have indicated that hydrochloric acid alone will also obtain good results. Also, our experiments indicate that nitric acid alone will obtain good results. It is within the scope of our invention to utilize either one of these acids alone or two or more of them together.

Our experiments have indicated that certain organic acids may be also utilized instead of hydrochloric, sulfuric or nitric acids. For example, we have found that oxalic acid may be utilized for the purpose indicated.

We have been able to lower the iron content of aplite which has previously been magnetically treated from about 0.25% to about 0.089%. Though we do not care to be limited by a statement of what seems to occur, apparently the calcining weakens the molecular bond of the iron oxide molecules in the rock, aplite, and more particularly, in the material zoisite which forms a part of such aplite, so that the strong acids previously discussed will remove the iron as ferrous and ferric salts without disrupting the properties of the other desired minerals in the rock.

Comparing aplite with feldspar, in their original states, aplite normally contains about 24% of aluminum oxide whereas feldspar contains about 19.5% of aluminum oxide in the better grades and as low as 15% in the relatively poorer grades. If this high aluminum oxide percentage be retained in the making of such materials as glassware, it will add to the physical strength of the glassware and give it better working range by increasing the viscosity range. It will also prevent devitrification of the glass. Likewise, it will prevent weathering. Furthermore, when the glass is being fed in the molten state to the molds, aluminum oxide forms a tough outer skin which prevents the formation of mold marks on the ware. Thus, it is apparent that a high aluminum oxide content in glass is desirable. One of the advantages of our invention results from the fact that we are able to obtain greater quantities of aluminum oxide by our treated aplite than can be obtained by feldspars now being marketed. Hitherto the high iron content of aplite has been a drawback but as a result of our process, the iron content is reduced to such a point that aplite can be substituted for feldspar in all cases where high iron content is undesirable.

Dealing more specifically with our invention, the aplite, after first being ground and screened, is then subjected to a magnetic treatment consisting of passage through the usual magnetic separator, such as Exolon, Stearns or Dings separators which serve to lower the iron oxide to approximately 0.25%. The magnetically treated aplite is then preferably subjected to our acid treatment, as follows:

In one test which we have made, we calcined the ground and screened aplite at 1700° F. and then treated it with concentrated hydrochloric acid for 30 minutes and then with an equal amount of a 50% solution of sulfuric acid, preferably covering the aplite with sulfuric acid. In this test, the iron oxide content was lowered from 0.258% to 0.093%. The following is a chemical analysis of the aplite before and after the treatment by this process:

|  | Original analysis | After treating |
|---|---|---|
| $SiO_2$ | 60.30 | 62.60 |
| $Fe_2O_3$ | .258 | 0.093 |
| $Al_2O_3$ | 24.64 | 22.59 |
| CaO | 6.04 | 4.86 |
| $Na_2O$ | } 8.23 | 8.17 |
| $K_2O$ | | |
| Loss on ignition | .53 | 1.69 |

As can be seen from the above table, the per cent of aluminum oxide is also reduced by this treatment, but it is still higher than that of feldspar. The loss of $Al_2O_3$ is no doubt due to the high temperature used in calcining the aplite. The $Fe_2O_3$ content is now low enough for use in making crystal glassware.

Other tests were made on the same samples of aplite and resulted as follows:

The aplite was calcined at 1700° F. and then treated with HCl for 5 minutes and then covered with a 50% solution of $H_2SO_4$. This resulted in a reduction of the $Fe_2O_3$ content to 0.089.

Another test was performed by calcining this aplite at 1900° F. and then treating with a solution of 50% $H_2SO_4$. The $Fe_2O_3$ content in the aplite, after treatment, was 0.129. This test did not include treatment with hydrochloric acid.

In another test performed at the same time, and at the same calcining temperature of 1900° F., we then used equal parts of hydrochloric acid and sulfuric acid with the result that the iron oxide content was reduced to 0.089%. Under these same conditions, the same result was achieved when the calcining temperature was 1700° F., thus indicating that this difference in temperature did not materially alter the iron oxide content after treatment.

It should be understood that the treatment of the calcined aplite may be effected either at room temperature or at any temperature up to the boiling point of the acids used.

One advantage of this process is that a much cheaper material can be made available to the ceramic industry. Another advantage is that aplite, which has a higher alumina content than feldspar, may be so treated as to adequately lower the iron oxide content so that it may be used in the higher types of glassware as a substitute for feldspar. Still another advantage is that the iron oxide content of the aplite may be so lowered by our process that glass or ceramic ware will not be discolored when the aplite is used.

Other advantages will appear from the following claims.

Having thus described our invention, what we claim is:

1. A process for reducing the iron content of aplite which comprises calcining aplite containing iron compounds at a temperature from 1000° F. to 2500° F. for a time sufficient to render the iron content soluble in acids, and then leaching the aplite with an acid for a time sufficient to dissolve a major portion of the iron content, while leaving the greater part of the original alumina content unattacked.

2. A process according to claim 1 wherein the aplite is calcined at a temperature ranging from about 1000° F. to 1700° F.

3. A process according to claim 1 wherein the aplite is leached with at least one acid selected from the group consisting of sulfuric and hydrochloric acids.

RALPH F. BRENNER.
ROGER D. DUBBLE.